United States Patent [19]

Hiraku et al.

[11] Patent Number: 4,860,715
[45] Date of Patent: Aug. 29, 1989

[54] DEVICE FOR PURIFYING FUEL VAPOURS GENERATED IN VEHICLE FUEL TANK

[75] Inventors: Akira Hiraku; Morio Minezawa; Isao Katoh; Kouichi Itoh, all of Toyota, Japan

[73] Assignees: Toyota Jidosha Kabushiki Kaisha; Horie Metal Co., Ltd., both of Aichi, Japan

[21] Appl. No.: 199,650

[22] Filed: May 27, 1988

[30] Foreign Application Priority Data

| May 29, 1987 | [JP] | Japan | 62-85101[U] |
| May 29, 1987 | [JP] | Japan | 62-85103[U] |
| May 29, 1987 | [JP] | Japan | 62-85104[U] |
| May 29, 1987 | [JP] | Japan | 62-85105[U] |
| May 29, 1987 | [JP] | Japan | 62-85106[U] |
| May 29, 1987 | [JP] | Japan | 62-85107[U] |

[51] Int. Cl.$^4$ ............................................. F02M 39/00
[52] U.S. Cl. ..................................... 123/519; 123/516
[58] Field of Search ............... 123/518, 519, 514, 520, 123/501, 516

[56] References Cited

U.S. PATENT DOCUMENTS

| 3,662,725 | 5/1972 | Dragon | 123/518 |
| 3,672,537 | 6/1972 | Kitzner | 123/518 |
| 4,646,701 | 3/1987 | Fukumoto | 123/516 |
| 4,651,889 | 3/1987 | Uranishi | 123/519 |
| 4,659,346 | 4/1987 | Uranishi | 123/519 |
| 4,742,809 | 5/1988 | Ito | 123/516 |

FOREIGN PATENT DOCUMENTS

| 00A4444 | 4/1981 | Japan | 123/518 |
| 0154154 | 11/1981 | Japan | 123/519 |

Primary Examiner—Carl Stuart Miller
Attorney, Agent, or Firm—Sughrue, Mion, Zinn, Macpeak & Seas

[57] ABSTRACT

A device for purifying fuel vapours generated in vehicle fuel tank including a valve which normally closes a through hole provided in an upper wall of the tank and communicating with a canister through a conduit, a flap provided for normally closing a filler pipe mounted for refuelling the tank and adapted to be opened by a fuel dispensing nozzle inserted in the filler pipe, and a member for connecting the flap with the valve so as to transmit the opening movement of the flap to the valve to open the latter for allowing the fuel vapors in the tank to pass through the hole and the conduit into the canister.

11 Claims, 8 Drawing Sheets

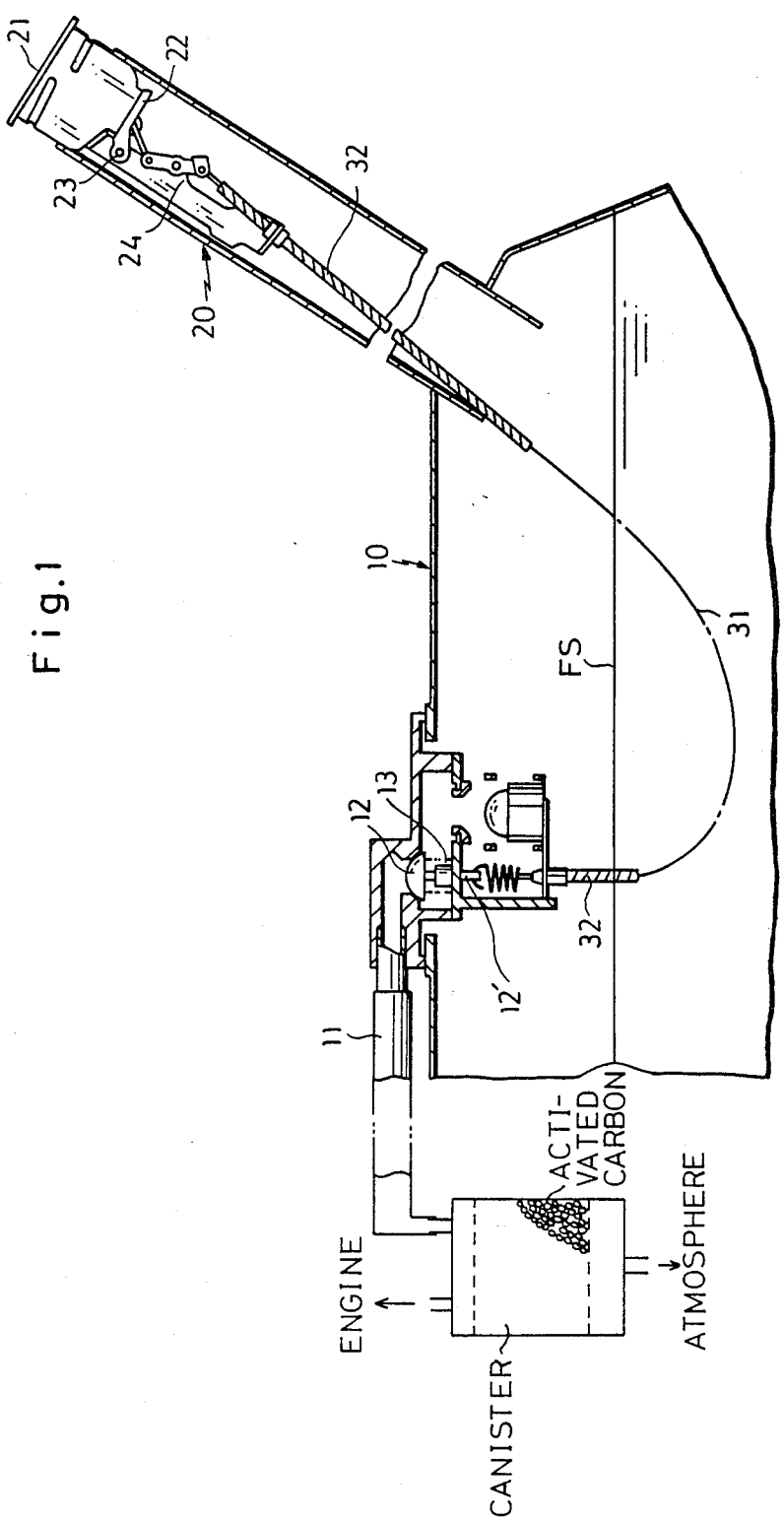

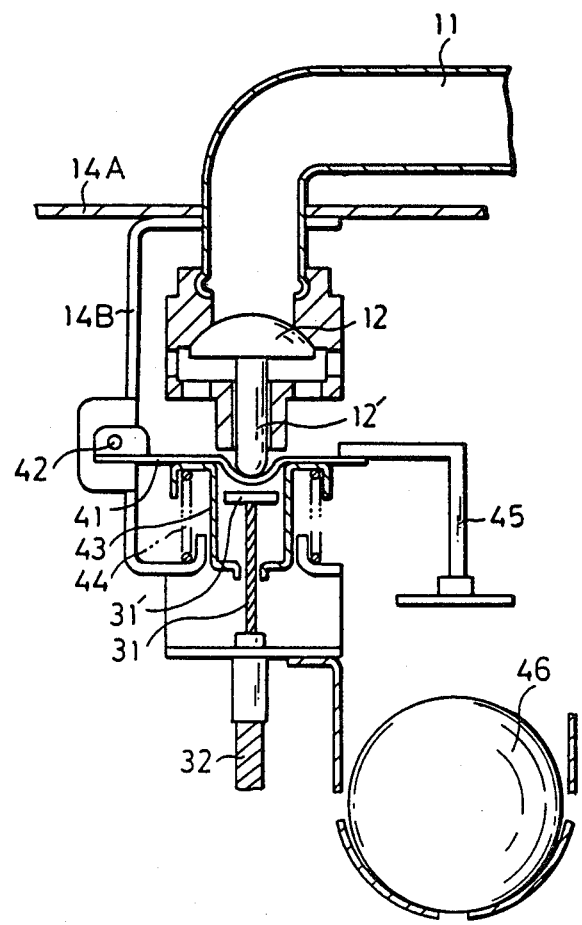

DEVICE FOR PURIFYING FUEL VAPOURS GENERATED IN VEHICLE FUEL TANK

BACKGROUND OF THE INVENTION

The invention relates to a device for purifying fuel vapours filled in a fuel tank and a filler pipe of an internal combustion engine powered vehicle, through a hole formed in the tank upper wall to be conducted into a canister for vapours recovery and clarification. More particularly it relates to such device in which a valve normally closing said hold is adapted to be automatically open in reply to insertion of a fuel dispensing nozzle into the filler pipe.

The fuel for the internal combustion engine is of a lower boiling point so as to be vaporized more or less in the fuel tank and the filler pipe. When the cap closing the open end of the filler pipe is disengaged therefrom for refuelling, fuel vapours filled therein are expelled as the fuel surface is raised and released in the atmosphere. This is not desirable in view of protection of environment and saving useless loss of energy.

In order to solve the problems referred to above, some proposals have been made by allowing fuel vapours to be expelled out of the fuel tank through a hole formed in the fuel tank upper wall during refuelling to be burned in the internal combustion engine through a canister containing for instance activated carbon and a carburetor, e.g. U.S. Pat. No. 3,957,025.

However, this is not satisfactory in view of a complexity of the system and troublesome actuation.

In U.S. Pat. No. 4,715,509 owned by the assignees of the present patent application, a fuel filler pipe provided with a mechanism adapted to open a hole connected to the internal combustion engine via the canister and the carburetor and normally closed by a valve when inserting the fuel dispensing nozzle into the filler pipe to open a flap provided near to the open end thereof is disclosed.

This is still unsatisfactory in view of a fairly many parts to be assembled.

SUMMARY OF THE INVENTION

An object of the invention is, thus, to provide a device for exhausting fuel vapours out of the tank and the filler pipe in a more simple construction and at less expense.

The object can be fundamentally attained according to the invention by providing valve means normally closing a hole formed in an upper wall of the tank and communicating with a canister through a conduit, a flap normally closing a filler pipe mounted on the tank for refuelling, said flap being opened when a fuel dispensing nozzle is inserted in the filler pipe for refuelling, and means for connecting the flap with the valve means so as to open the valve means to allow the fuel vapours to pass through the hole and the conduit into the canister when the flap is opened. There are caused, however, various problems in such a simple mechanism.

Other objects of the invention is to provide solutions of such problems.

BRIEF DESCRIPTION OF THE DRAWINGS

The invention will be explained in more detail as to preferred embodiments thereof in reference to attached drawings, in which;

FIG. 1 is a longitudinal section of a fuel filler pipe and a part of a fuel tank in which a device according to the invention as provided, FIG. 4A is a sectional view of a part of the device according to the other embodiment of the invention arranged in the fuel tank.

DETAILED DESCRIPTION OF THE INVENTION

Figure 2A:
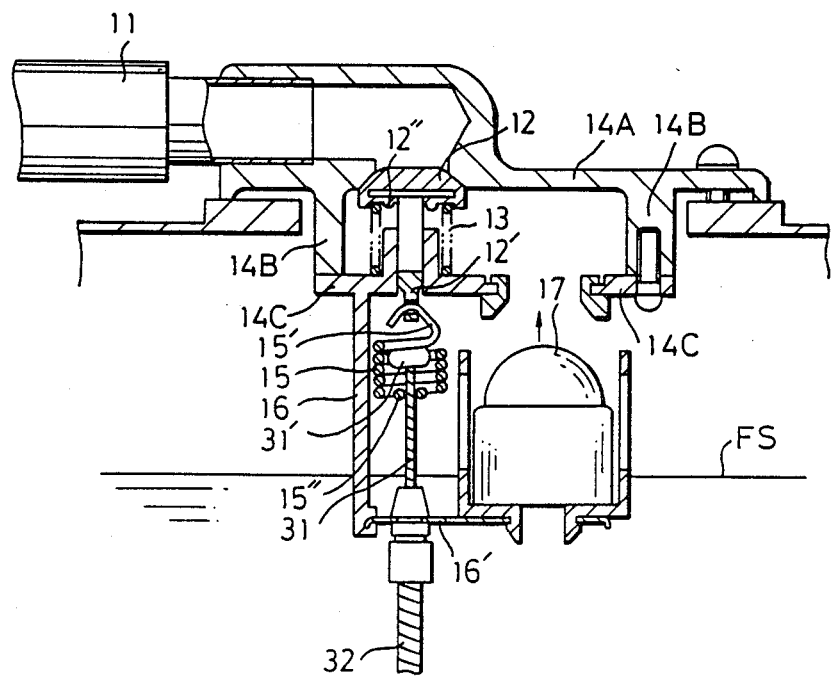
FIG. 2A is a longitudinal sectional view of a part of the device according to the invention arranged in the fuel tank in an enlarged scale.

In FIG. 1, a fuel tank of a motor vehicle (not shown) represented generally by 10 has a fuel filler pipe generally represented by 20 connected therewith at one open end, another open end of which is arranged in the vicinity of a body wall of the motor vehicle and mounted with a receptacle 21 to which a cap (not shown) can detachably be mounted so that a fuel dispensing nozzle, not shown, may be inserted into the filler pipe 20.

The tank 10 is formed with a through hole in an upper wall thereof, which is connected through a conduit 11 with a conventional charcoal canister disposed elsewhere in the motor vehicle so that fuel vapours filled in the tank 10 and the filler pipe 20 may be expelled out thereof, as a fuel surface FS is raised up by fuel dispensing, to be conducted to the canister. The canister stores fuel vapours until such vapours are utilized in engine operation so as to save energy and prevent atmosphere from being polluted by fuel vapours otherwise leaking out of the filler pipe.

The hole is normally closed by a valve 12 which is urged in position by a coiled compression spring 13 in order to prevent fuel vapours from leaking therethrough and fuel from further vaporizing, but may be brought in the open position when a stem 12' of the valve 12 is pulled down against the force of said spring 13 so as to allow fuel vapours to be expelled out of the tank 10 as referred to above.

The filler pipe 20 is provided therein with a flap 22 normally kept in a closed position by spring means (not shown). Flap 22 is adapted to angularly move in a clockwise direction in FIG. 1 on a pin 23 planted on a bracket 24 which is mounted within the filler pipe 20, by mannually pushing the fuel dispensing nozzle down against the force of said not shown spring means as referred to above.

The valve 12 is connected with the flap 22 by means of an extended flexible inner wire 31, according to the invention, so that when the flap 22 is angularly moved to be open for fuel dispensing, the inner wire 31, one end of which is fixed through a link mechanism with the flap 22, is moved in and along an extended outer sheath 32 towards the outlet of the filler pipe 20, whereby the valve 12 of which stem 12' is fixed with the other end of the inner wire 31 is pulled down against the force of the spring 13 for allowing fuel vapours to be expelled through the open valve 12.

As best shown in FIG. 2A, the valve 12 and the coiled compression spring 13 are arranged in a valve chamber defined by an upper wall 14A of the tank 10, vertical opposite end walls 14B, 14B respectively downward extending therefrom, a bottom wall 14C and opposite side walls one of which is not shown in the sectional view so that the valve 12 may normally close the through hole, referred to above, formed in the upper wall 14A and the valve stem 12′ may extend through a groove formed in the bottom wall 14C to be partly exposed out of the valve chamber.

It is preferable to provide a coiled spring 15, for compensating the slight difference of amount of draw causing every installed inner wire 31, between the valve stem 12′ and the free end of the inner wire 31 partly exposed out of the free end of the outer sheath 32 which is fixed on a transversely bent bracket 16′ from a downwardly suspended frame 16 from said bottom wall 14C so that the partly exposed inner wire 31 may extend towards said valve stem 12′. One end of the tension spring 15 is hooked 15′ so as to engage with the valve stem 12′ in a hole formed therein.

In order to make a movement stroke of the valve 12 shorter and that of the inner wire longer relative thereto by a reason well known to those skilled in the art, the usually used buffer spring of the type in question has a hook also at the other end to engage in a length of groove formed in the concerned member which corresponds to a free end portion of the inner wire or an enlarged diameter bar fixed thereto according to the invention, for providing a desired play corresponding to said length.

Figure 2B:
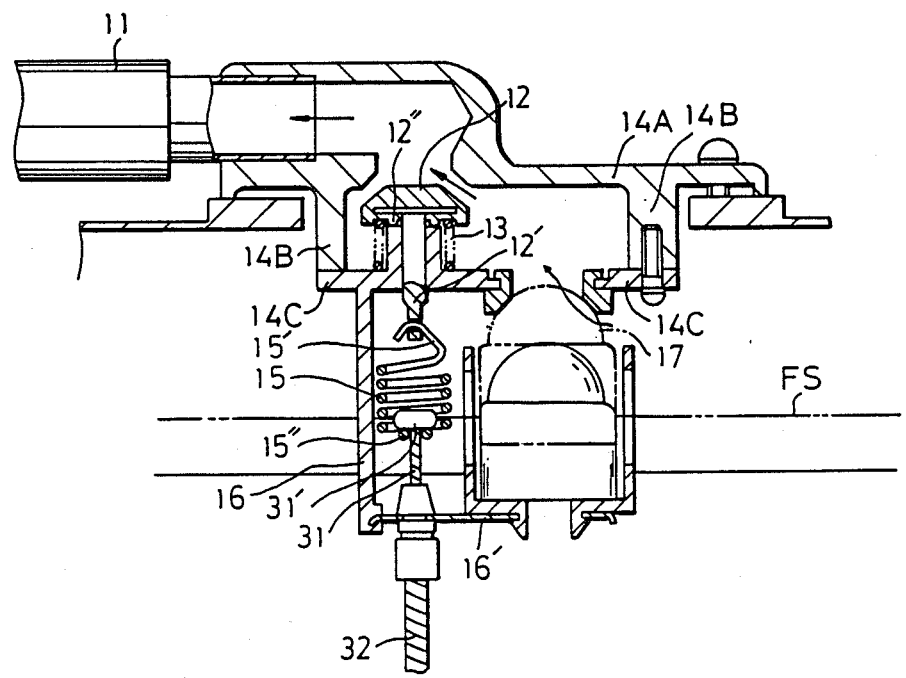
FIG. 2B is a similar view but showing a state where movable members are in different positions.

It is not preferable, however, to arrange such a conventional buffer spring in a relatively narrow space such as a fuel tank like as in the invention. According to a preferred embodiment of the invention, thus, the free end of the inner wire 31 is provided with an enlarged head 31′ so as to freely move up and down in the space defined by the coiled spring 15. The up and down movement of the enlarged head 31′ is limited by abutment thereof on the root portion of the hook 15′ and by engagement thereof with a reduced diameter portion 15″ formed at the bottom of the coiled spring 15. When the inner wire 31 is pulled down as shown in FIG. 2B, the enlarged head 31′ is moved down in the coiled spring 15. When the enlarged head 31′ abuts on the reduced diameter portion 15″, the tension coiled spring 15 is then expanded to pull the valve 12 to open against the force of the weaker compression spring 13.

It goes without saying that the chamber, in which the valve 12 and the coiled spring 13 are arranged, must be open to the tank 10 so that the fuel vapours existing therein and above a level of the fuel surface FS may be expelled out of the tank to flow into said valve chamber through said opening and then into the conduit 11 through the valve 12. It is not preferable, however, that as the level of the fuel surface FS rises in the course of refuelling, fuel flows into the valve chamber through said opening.

Thus, according to a preferred embodiment of the invention, there is provided a float valve 17 at the vicinity of said opening so that as the fuel surface FS rises up, the float valve 17 may be raised to finally close the opening.

Figure 3:
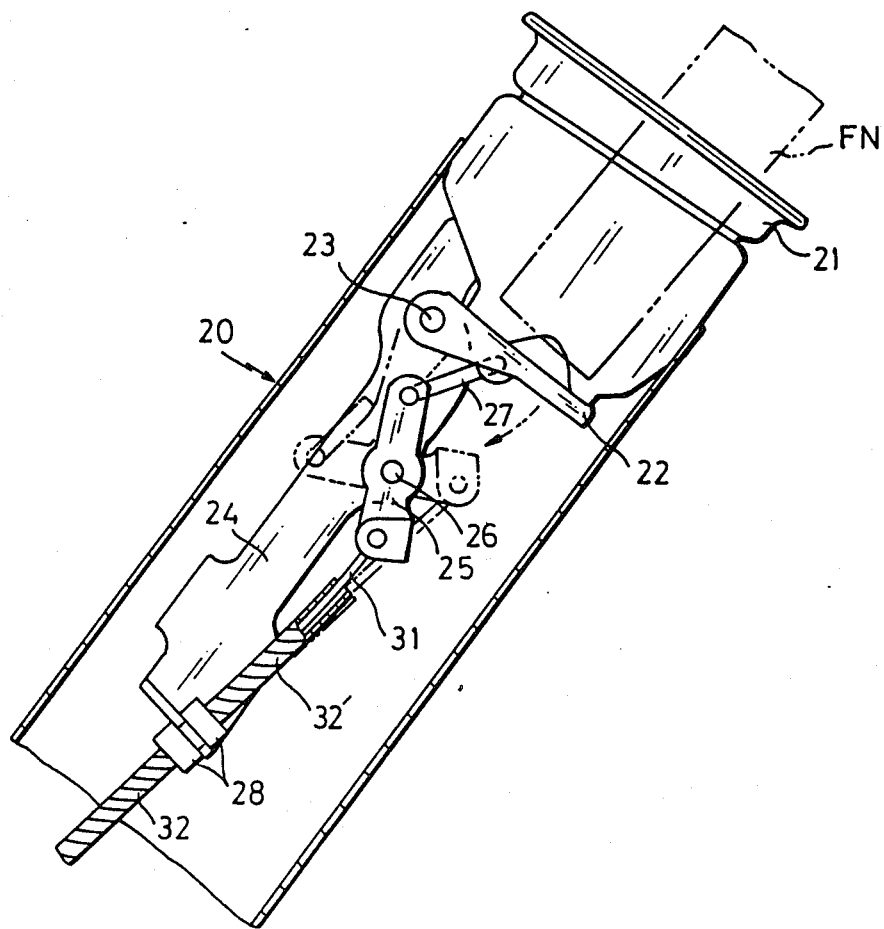
FIG. 3 is a longitudinal section of a part of the device of the invention arranged in the fuel filler pipe in an enlarged scale.

Now in reference to FIG. 3, the link mechanism according to a preferred embodiment of the invention is shown for mechanically connecting the free end of the inner wire 31 with the flap 22 so that the inner wire 31 is moved in and relative to the outer sheath 32 when the flap 22 is opened by the tip end of the fuel nozzle shown by FN manually pushed down as referred to above. The link mechanism comprises a lever arm 25 pivoted on a pin 26 planted on the bracket 24, as referred to above, so as to angularly move between the normal position shown in solid lines and the operative position shown in phantom lines. One end thereof is linked with the flap 22 by a rod 27, while the other end is connected with the free end of the inner wire 31 is exposed out of the flexible sheath 32 which is fixed to the bracket 24 at 28 so that when the flap 22 is angularly moved in the direction shown by an arrow, the rod 27 and the lever arm 25 are brought respectively in the positions shown by the phantom lines, where the inner wire 31 is also brought in the position of phantom lines. Thereby the valve 12 is opened. When the nozzle FN is retracted, the flap 22 may be returned by the spring means not illustrated so that the flexible inner wire 31 is pushed down into the flexible outer sheath 32 and thus the valve 12 is returned to the normal sealing position.

As readily seen from the drawing, the flexible inner wire 31 is inevitably bent when pushed into the outer sheath with friction between the outer peripheral surface of the former and the inner wall surface of the latter, and if the length of the exposed portion of the inner wire is relatively longer. Such bending will cause unreliable reaction of the valve 12, of which repetition grows into a habit to amplify the bending and consequently unreliability of the valve movement.

Thus, the outer sheath 32 must be fixed (28) to the bracket 24 while leaving some length of the inner wire 31 so as to allow free flexion, but the length of the inner wire 31 is preferably covered with a sheath 32′ of the same material or a more flexible material as long so far as not interfere with the angular movement of the lever arm 25 to which the free end of the inner wire is fixed.

Now in reference to FIG. 4A showing the other embodiment having a sole valve 12, in which the valve 12 is opened by pulling down the flexible inner wire 31 when the fuel nozzle FN pushes the flap 22 to be opened and is closed when the fuel nozzle FN is pulled out from the filler pipe 20, similar to the embodiment referred to above, but, in accordance with this second embodiment, the valve 12 is also closed by a float 46 when the fuel surface FS reaches at a predetermined level, such as "full tank" refuelling level, different from the first embodiment in which the other opening is provided to be closed by the float valve 17 when the fuel surface reaches the "full tank" refuelling level. The similar members are represented by the same reference numerals.

The valve 12 is normally closed for preventing fuel vapours from leaking into the conduit 11 not by the spring 13 directly actuating it but by an angularly movable plate 41 pivotally mounted 42 on the side wall 14B, on which the valve stem 12′ is abutted at the free end. Said plate 41 is supported in position by a sleeve 43 which is urged by a coiled spring 44. The inner wire 31 protruded out of the outer sheath 32 extends through a hole formed in the bottom wall of the sleeve so that, when the inner wire 31 is pulled down, the enlarged head 31′ thereof abuts on the sleeve bottom and then the sleeve 43 is pulled down against the force of said coiled spring 44. Thus, the plate 41 is angularly moved to be in the position shown in FIG. 4B so that the valve 12 is brought in the open position shown therein.

Figure 4B:
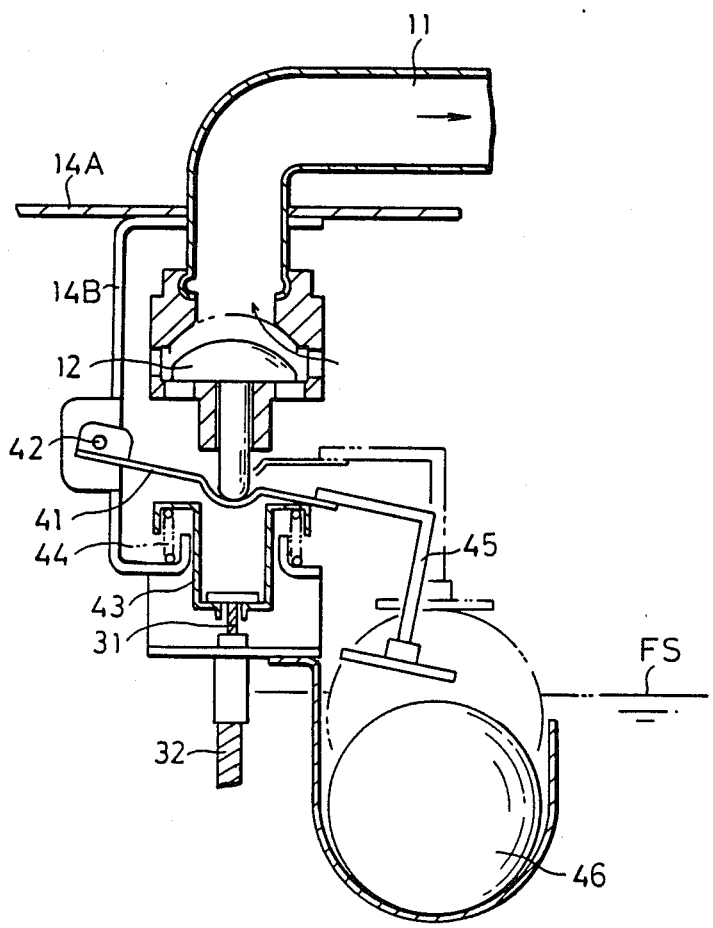
FIG. 4B is a similar view but showing a state where movable members are in different positions.

At the free end of the plate member 41, there is attached an abutment 45 so that when a buoy 46 received by a guide member is lifted by the rising fuel surface FS during refuelling from the position shown by solid lines to the position shown by phantom lines in FIG. 4B, the abutment 45 is also lifted up thereby and consequently the plate member 41 is angularly moved to return to the normal position also shown by phantom lines. Thereby the valve 12 is lifted up to be in the normal closed position, despite which the fuel nozzle FN is not yet withdrawn and consequently the sleeve 43 and the coiled spring 44 are kept still in the position in FIG. 4B. When the fuel nozzle FN is withdrawn, the inner wire 31 is pushed up in FIG. 4B so that the sleeve 43 is returned to the normal position in FIG. 4A by virtue of the coiled spring 44.

As well known to those skilled in the art, in the "full tank" refuelling, the tank can not be filled with fuel "in full" according to the literal sense but some space in the tank above the fuel surface must be left, because, when the ambient temperature is raised, fuel is expanded to cause some trouble or danger. Refuelling may be thus stopped in view of that the pressure of fuel vapours existing in said space is suddenly raised, when the fuel surface FS rises close to the uppermost level.

In the device according to the invention, however, there is arranged in the valve chamber the valve 12 of which stem 12' is extended through a groove formed in the bottom wall of said chamber. Thus, it is necessary to air-tightly seal this portion as far as possible, but usual countermeasure e.g. providing of O-ring around the valve stem 12' is not preferable since the smooth up and down movement of the valve 12 may be obstructed thereby.

According to a preferred embodiment, there is formed an annular rib 12" on the under surface of the valve 12 so as to abut on the upper surface of the bottom wall 14C or the sleeve upwardly protruded therefrom for air-tightly sealing as shown in FIGS. 2A and 2B. It is possible to form a corresponding annular groove in the upper surface for attaining more satisfactory airtight sealing therebetween.

Figure 5A:
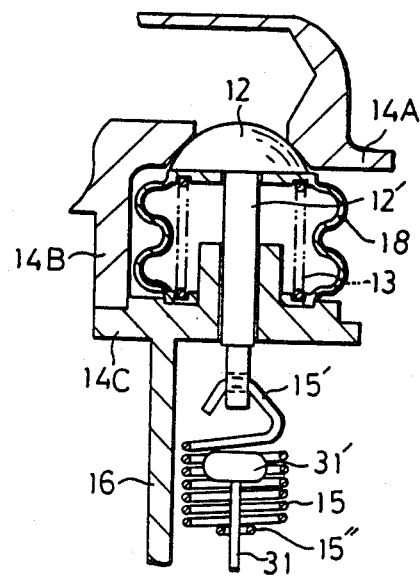
FIG. 5A is a sectional view of a part of the device according to the still other embodiment of the invention.
Figure 5B:
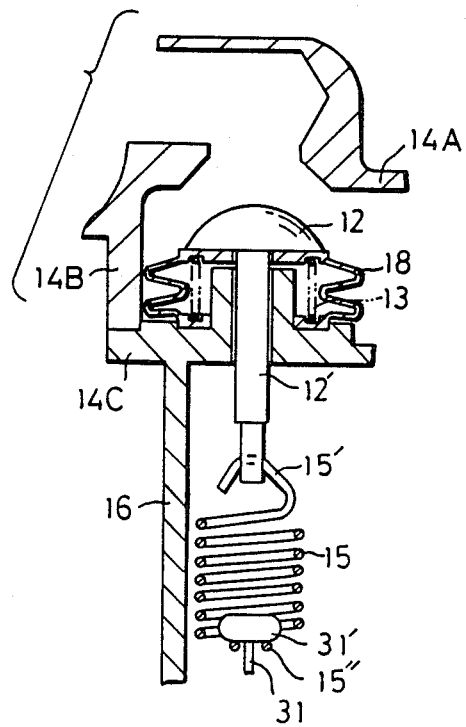
FIG. 5B is a similar view but showing a state where movable members are in different positions.

As seen in FIGS. 5A and 5B alternately or in addition to the above annular rib 12" it is possible to provide a cylindrical bellows 18, made of a material flexible and chemically resistant to the fuel, around the coiled spring 13, of which upper and lower peripheries are respectively gas-tightly attached to the under surface of the valve 12 and the upper surface of the bottom wall 14C. Accordingly, the fuel vapours generated in the tank and passed through the possible clearance between the stem 12' and the sleeve into the bellows 18 are prevented to escape therefrom and enter into the valve chamber, after the float valve 17 closes the cooperating opening as the fuel surface FS rises up due to the refuelling.

What is claimed is;

1. A device for purifying fuel vapours generated in a vehicle fuel tank comprising:
   valve means normally closing a hole formed in an upper wall of the tank and communicating with a canister through a conduit, a flap normally closing a filler piper mounted on the tank for refuelling, said flap being opened when a fuel dispensing nozzle is inserted in the filler pipe for refuelling, an extended flexible wire for connecting the flap with the valve means so as to open the valve means to allow the fuel vapours to pass through the hole and the conduit into the canister when the flap is opened, and a valve chamber accommodating the valve means and defined by the upper wall of the tank, an opposite bottom wall which is formed with a second hole to the interior of the tank in order to allow the fuel vapours filled in the tank and the filler pipe to enter the valve chamber and a sleeve for guiding a stem of the valve means which is partly protruded out of the valve chamber and connected with the flexible wire so as to move up and down, and vertical walls therebetween.

2. The device as set forth in claim 1, which further comprises a bracket mounted within the filler pipe on which said flap is pivotally mounted for angular movement; an arm lever pivotally mounted on said bracket for angular movement at the center thereof and connected at its one with the free end of the flexible wire; and a link rod connecting one end of said arm lever to the flap, whereby the angular movement of said flap in the open position may cause the valve means to move in the open position.

3. The device as set forth in claim 2, in which said inner wire is covered with the flexible sheath as long so far as not to hinder the angular movement of the arm lever.

4. The device as set forth in claim 1, which further comprises a buffer spring of which one end is engaged with the valve stem while the other end is connected to the free end of the flexible inner wire.

5. The device as set forth in claim 4, in which the upper end of said buffer spring is hooked to engage with the free end of the valve stem, while the lower end of the buffer spring has a reduced diameter portion so that an enlarged head formed at the free end of the flexible inner wire may freely move up and down in the space defined by the buffer spring.

6. The device as set forth in claim 1, which further comprises a float valve mounted on said frame in such a way that when a level of fuel surface rises in the tank by refuelling exceeding a predetermined level, said float valve may rise up to close said second hole for preventing fuel from entering the valve chamber.

7. The device as set forth in claim 1, which further comprises an angularly movable member pivotally mounted on said frame fixed to the valve member so as to abut on the free end of the valve stem; a coiled spring mounted on said frame so as to normally urge said angularly movable member up and consequently the valve means up to close the first hole, while said coiled spring is adapted to be compressed by opening said flap for refuelling to pull down the flexible inner wire so as to allow the valve means to be in the open position; a float member held by said frame in such a way that when fuel surface rises by refuelling to be at a predetermined level, the free end of said member is angularly moved thereby to push up the valve means to close the first hole again with leaving said coiled spring in compressed state; said coiled spring being returned to be in the normal state when the fuel dispensing nozzle is retracted out of the filler pipe.

8. The device as set forth in claim 1, in which said valve means is provided with an annular protrusion on the under surface of the valve body so as to attain vapours tight sealing against the sleeve in the valve open position.

9. The device as set forth in claim 1, in which said valve means is provided with a cylindrical bellows of which upper and lower peripheries are respectively vapours tightly attached to the under surface of the valve body and the upper annular surface of the sleeve formed in the bottom wall.

10. The device as set forth in claim 2, which further comprises a flexible sheath covering the flexible wire so that the wire is longitudinally movable relative to the sheath, said flexible sheath being connected at one end thereof to the bracket and at the other end thereof to a frame fixed to the valve chamber so that the wire is partly exposed out of the flexible sheath at the both ends thereof towards the arm lever on one hand and the free end of the valve stem on the other hand.

11. The device as set forth in claim 10 in which the end of the flexible sheath on the side of the bracket covers the flexible wire as long so far as not to hinder the angular movement of the arm lever and is yieldable to the lateral deflection of the corresponding end of the flexible wire.

* * * * *